Sept. 16, 1969  J. C. GRANT  3,466,693
PIPE WIPER

Filed Jan. 14, 1966  5 Sheets-Sheet 1

JOHN C. GRANT
INVENTOR.

BY John O. Evans, Jr.

ATTORNEY

Sept. 16, 1969  J. C. GRANT  3,466,693
PIPE WIPER
Filed Jan. 14, 1966  5 Sheets-Sheet 2

JOHN C. GRANT
INVENTOR.

BY John O. Evans, Jr.

ATTORNEY

Sept. 16, 1969     J. C. GRANT     3,466,693
PIPE WIPER
Filed Jan. 14, 1966     5 Sheets-Sheet 3
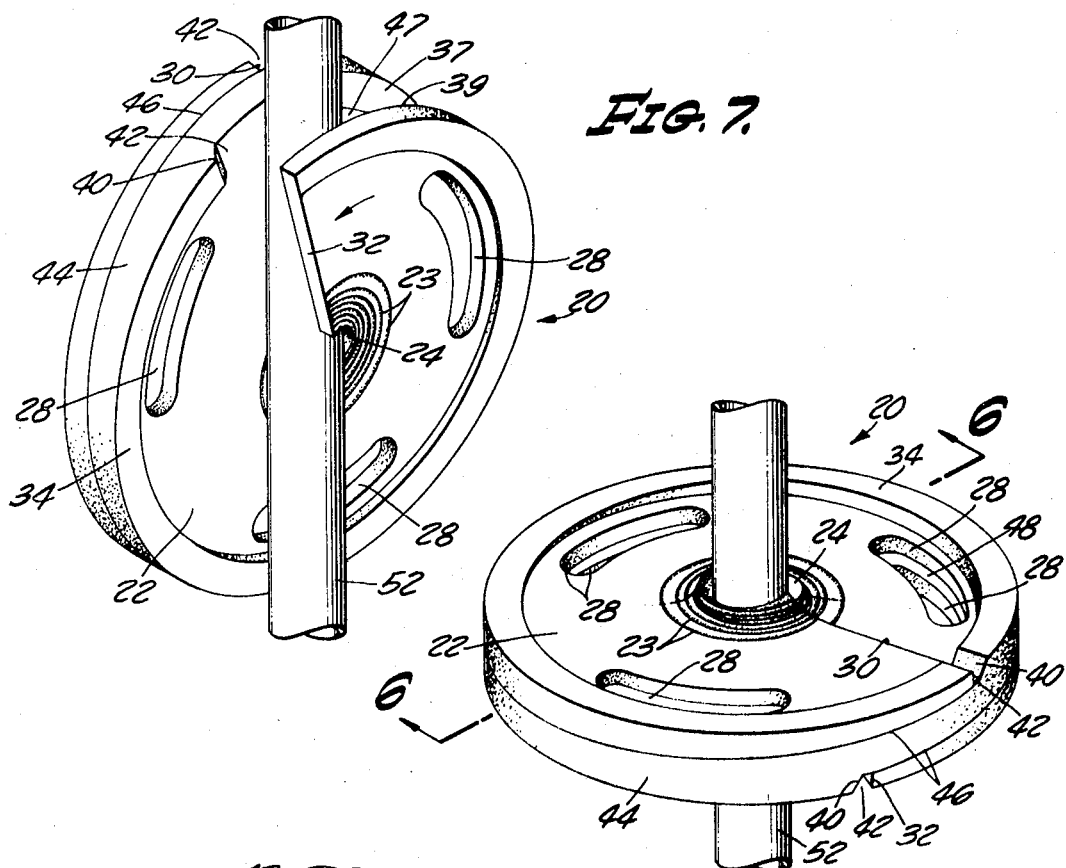
FIG. 7.
FIG. 9.
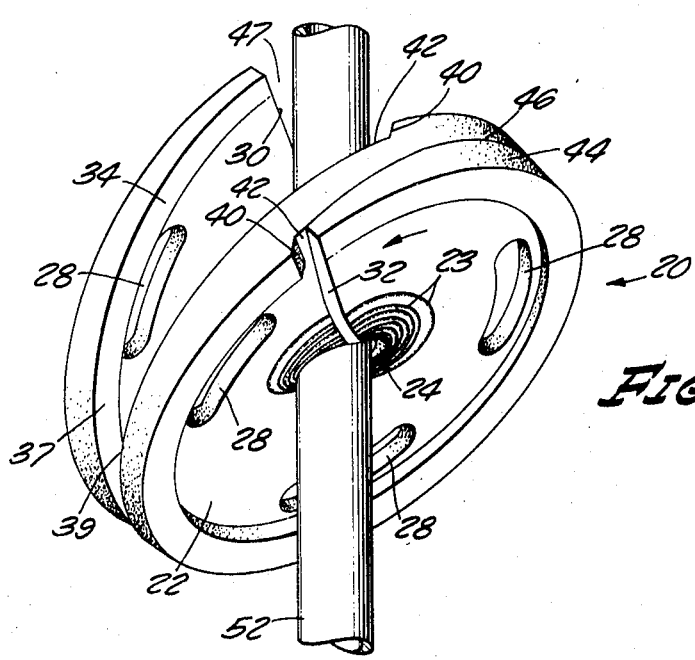
FIG. 8.
JOHN C. GRANT
INVENTOR.
BY John O. Evans, Jr.
ATTORNEY Sept. 16, 1969   J. C. GRANT   3,466,693
PIPE WIPER
Filed Jan. 14, 1966   5 Sheets-Sheet 4

JOHN C. GRANT
INVENTOR.

BY John O. Evans, Jr.

ATTORNEY

Sept. 16, 1969    J. C. GRANT    3,466,693
PIPE WIPER

Filed Jan. 14, 1966    5 Sheets-Sheet 5

JOHN C. GRANT
INVENTOR.

BY John O. Evans, Jr.

ATTORNEY

United States Patent Office 3,466,693
Patented Sept. 16, 1969

3,466,693
PIPE WIPER
John C. Grant, Huntington Park, Calif., assignor to Byron Jackson Inc., Long Beach, Calif., a corporation of Delaware
Filed Jan. 14, 1966, Ser. No. 520,752
Int. Cl. F16j 15/32, 15/56
U.S. Cl. 15—210                                    6 Claims

ABSTRACT OF THE DISCLOSURE

A wiper for cleaning pipe as the latter is drawn through an axial opening in the wiper, the wiper being formed of a continuous convolute web of elastomeric material around the axial opening, the outer peripheral edge of the web including an abutting spacer portion for spacing axially apart the adjacent convolutions of the convolute web.

---

This invention relates to wipers for cleaning mud, oil, and other foreign material from pipe, tubing, kellys, rods, cable, wire, and the like as they are pulled through the wiper, and in particular to pipe wipers for wiping drill pipe and tubing as they are being withdrawn from a well.

It is common practice when pulling pipe from oil wells to wipe the drilling mud and oil from the pipe by means of a wiper in the form of an annular disc of flexible material, usually rubber or other elastomeric composition, placed at the top of the well below the rotary table, and through which the pipe is drawn. The extraneous material is thus removed by the inner edge surfaces at the central opening of the wiper, and allowed to drip or flow back into the well. Most wipers generally in use have an unbroken annular disc or pair of discs, and are stretched over the end of the pipe preparatory to wiping. This is an inconvenient procedure, as the pipe must be unjointed to effect the installation. For that reason some wipers have been made with connecting slits normal and parallel to the wiper disc from the central opening to the outside to allow them to be installed by spreading and twisting them onto the pipe. Because of their lack of symmetry, the discs being connected on one side and free or open on the other, the wiping action is not always as efficacious as desired, and they are difficult to install and remove; and the flexibility, wiping effectiveness, and wear are not uniform, resulting in somewhat misshapen parts after initial usage.

Accordingly, it is a primary object of the present invention to provide a pipe wiping disc comprising a generally helicoidal elastomeric web extending for more than 360°, the adjacent turns of the web being spaced apart, allowing adjacent wiping edge surfaces at the central opening to wipe independently, thus providing multiple wiping action.

Another object of the present invention is to provide a wiper of unitary, lightweight construction, easily threadable laterally onto and off the pipe.

An additional object of the invention is to provide a pipe wiper for lateral installation with substantially symmetrical shape and uniform construction.

Still another object is to provide a helicoidal-shaped wiper with a central opening having wiping surfaces to clean uniformly the circumference of the pipe surface without a tendency to leave unwiped streaks resulting from gaps in the inner wiping edge.

Yet another object of this invention is to provide a wiper of a single, continuous wiping edge surface, with an overlap of the free ends to give an uninterruped wiping edge around the circumference of the pipe.

A further object of the invention is to provide a pipe wiper of side-opening construction with a hiatus or gap preferably terminating in a taper or bevel adjacent the free ends of the wiping web to allow for movement of the free end on constriction of the outer periphery of the wiper.

A still further object of this invention is to provide a pipe wiper of substantially helicoidal shape, the outer peripheral edges of the helicoidal member being reinforced to resist lateral or circumferential expansion for rentention of pipe grip and wiping effectiveness, but with adequate flexibility for axial spreading for threading onto or off a pipe.

Another object of the invention is to provide a wiper of helicoidal shape, the downward slope of the web surfaces of which allows for normal drainage of material wiped from the pipe, in addition to which may be provided axial openings or windows through the wiper web to increase flexibility and provide supplemental drainage.

Still another object of the invention is to provide a pipe wiper of helicoidal form, the interstitial space between the laminar web convolutions or turns providing a uniform, through-passage for easily cleaning the wiper surfaces following usage, the cleaning also being facilitated by openings or windows through the web.

Yet a further object is to provide a pipe wiper with a continuous wiping edge of more than 720° in the central opening to provide two wiping edge surfaces on any element of the circumference to be wiped.

Briefly, the invention involves a pipe wiper for wiping mud and the like from pipe comprising: an annular disc-shaped body having a top surface and a bottom surface substantially parallel thereto, the body having a central opening therethrough and an outer peripheral surface, and being a continuous flexible web comprising elastomeric material, one end of the web terminating in the top surface and the other end terminating in the bottom surface and extending spirally about the central opening for substantially more than 360°; the spirals of the web having portions axially overlapping each other, the overlapping portions being axially abuttable with each other and being separable in the axial direction to pass a pipe, between the ends of the latter, from the exterior of the body through the space between the spirals and into the central opening and vice versa; and the web having a wiping surface at the central opening adapted to engage the surface of a pipe being drawn through the central opening for wiping mud from the pipe. The improvement in the invention comprises: the web having an inner lateral elastomeric web portion extending substantially from the one to the other end of the web, and having portions axially overlapping each other, the overlapping portions being axially separated from each other to form a space therebetween, the space extending continuously between the top and bottom surfaces, communicating laterally with the central opening, and having open ends communicating with the exterior at the surfaces; and the web portion having an inner edge providing a wiper surface extending for substantially the entire length of the web portion and adapted to substantially continuously engage the surface of a pipe inserted in the central opening, whereby mud that is wiped from the pipe into the space by the inner edge as the pipe is drawn through the central opening flows through the space to one of its open ends for discharge.

Further objects and advantages will appear as the invention is described with greater particularity in the following detailed description taken with the drawings.

In the drawings:

FIG. 7 is a perspective view of the wiper with one free end spread open the width of the pipe, in its initial position of being threaded onto the pipe;

FIG. 8 is a perspective view of the wiper near the end of the threading-on process;

FIG. 9 is a perspective view of the wiper installed on the pipe in axial alignment with the pipe;

Like reference characters in the various figures of the drawings and in the following descriptions designate corresponding parts.

A preferred form of pipe wiper in accordance with the invention is shown in FIGS. 1–9, inclusive.

Figure 1:
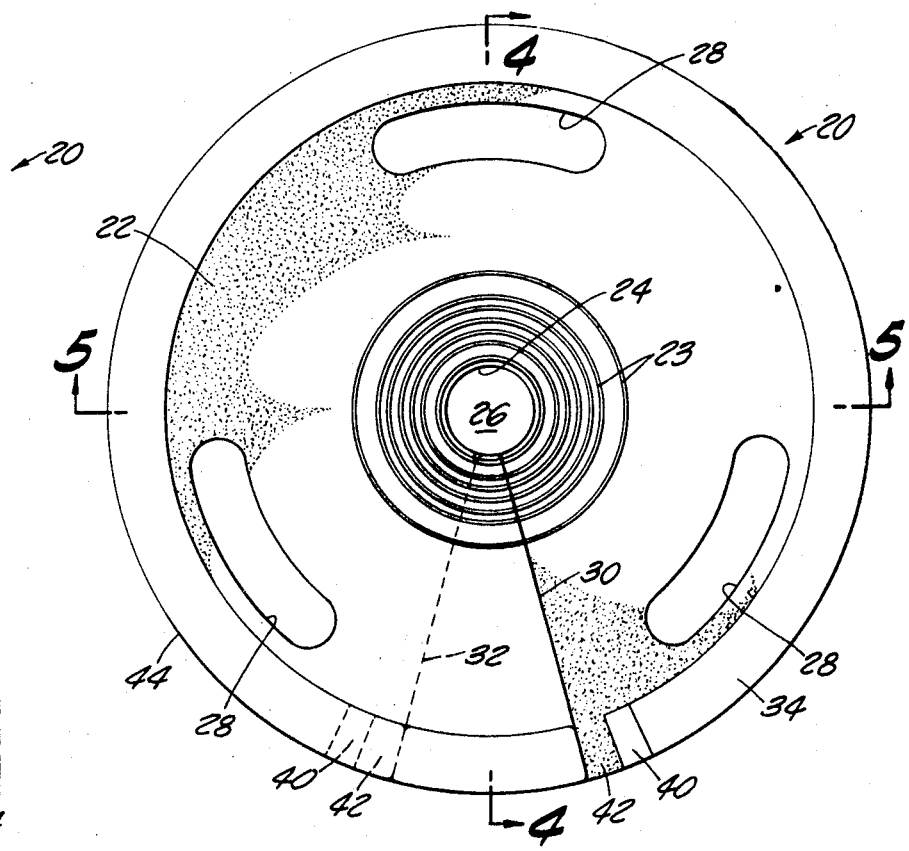
FIG. 1 is a plan view of an exemplary form of a wiper in accordance with the present invention.

Referring to FIG. 1, there is shown the pipe wiper 20 with its helicoidal elastomeric web 22 surrounding the central opening 26 to form the inner edge wiping surface 24, the concentric ridges 23 serving as cutting guides to enlarge the opening 26 to accommodate larger pipe diameters. Window openings 28 through the web 22 serve to increase its flexibility in addition to providing added drainage for mud and other debris cleaned from the pipe by the inner wiping edge 24. The wiper has a top free edge 30, and extends helicoidally to its bottom free edge 32. The axial spacer means or rib 34 keeps the convolutions or turns of the helical web 22 spaced apart throughout its extent from the top edge 30 to the bottom edge 32. The axial extension of the peripheral rib 34 stops short of the free ends 30 and 32 at its shoulders 40, providing a hiatus or space 42 therebetween to allow for free contractile movement of the exterior periphery 44 of the wiper 20.

Figure 2:
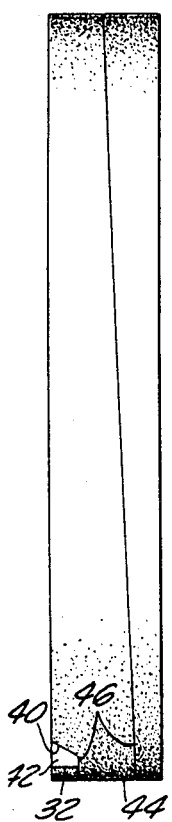
FIG. 2 is a left side elevational view of the wiper of FIG 1.
Figure 3:
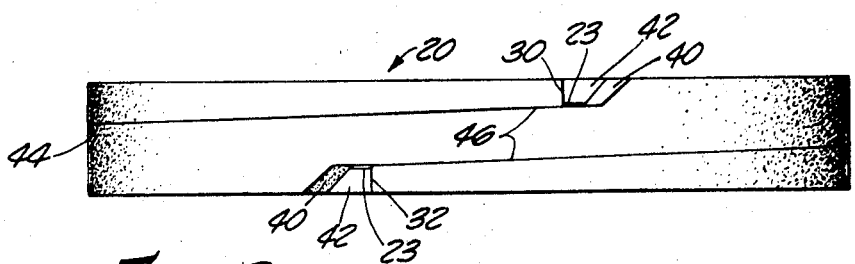
FIG. 3 is a front elevational view of the wiper of FIG. 1.

Referring now to FIGS. 2 and 3, the generally helical lateral opening 46 is seen extending around the outer periphery 44 of the wiper 20 from its top free end 30 to its bottom free end 32.

Figure 4:
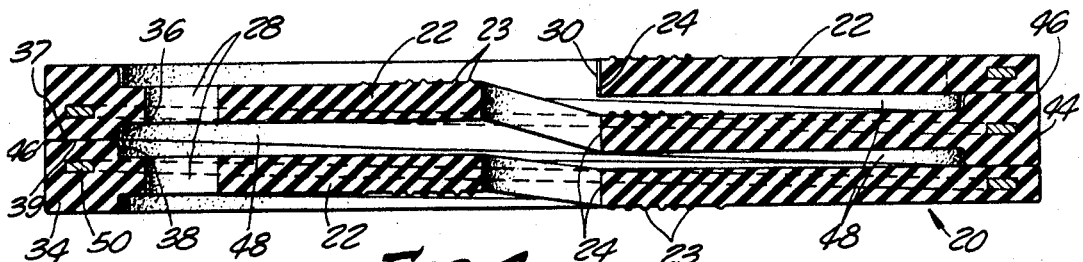
FIG. 4 is an enlarged sectional view taken on the line 4—4 of FIG. 1 and looking in the direction of the arrows.
Figure 5:
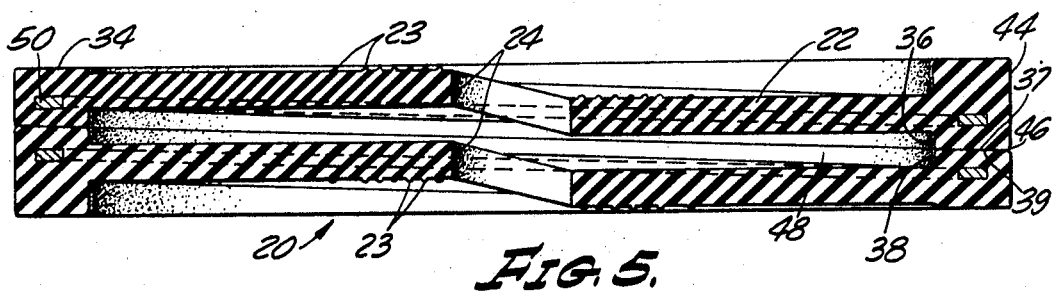
FIG. 5 is a sectional view on the same scale as FIG. 4, taken on the line 5—5 of FIG. 1 and looking in the direction of the arrows.

In FIGS. 4 and 5 is illustrated the axial spacer means 34 near the outer periphery 44 of the wiper 20, with its first or lower rib 36 and second or upper rib 38 separating adjacent laminar turns of the web 22 to form a generally helical interstitial space 48 from top to bottom of the wiper for effective drainage of wiped mud, the drainage being enhanced also by the window openings 28. First rib 36 and second rib 38 have separable lower and upper contact surfaces 37 and 39, respectively, to provide for installation and removal of the wiper 20 onto and off of a pipe. The helical reinforcing spring-shaped member 50 is shown embedded in the peripheral rib 34.

Figure 6:
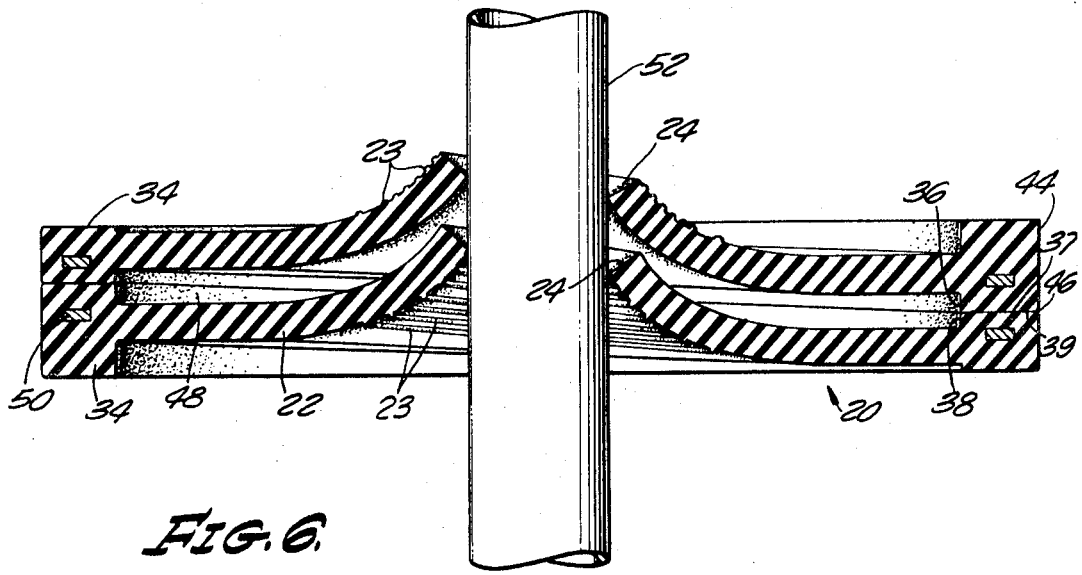
FIG. 6 is a view like that of FIG. 5, but showing the wiper in its normal wiping position on a pipe, being an enlarged sectional view taken on the line 6—6 of FIG. 9, looking in the direction of the arrows.

Referring to FIG. 6, the inner wiping edge 24 is shown in wiping position around a pipe 52, the first rib 36 and second rib 38 of the axial spacer means 34 providing a space 48 so that adjacent inner surfaces 24 of the web 22 provide a multiple wiping effect on the circumference of the pipe 52; and the downwardly-sloping helicline space 48, together with the window openings 28, provides drainage for wiped mud, oil, and other debris.

In FIG. 7 the wiper 20 is shown with its axis approximately normal to that of the pipe 52, and the generally helical opening 46 spread axially at the bottom free edge 32 to its open position 47, sufficiently to allow entry of the pipe.

In FIG. 8 the pipe 52 is shown having been threaded through the opening 46 and interstitial helical space 48 by rotation of the wiper 20 about its axis until the axially spread opening 47 is adjacent the top free edge 30 of the wiper.

In FIG. 9 the wiper 20 is shown coaxial with the pipe 52 in wiping position, as illustrated in its sectional view of FIG. 6, the helical opening 46 being in its closed position.

In a typical application of the device for wiping a pipe 52, the wiper 20 is held with its axis approximately normal to the axis of the pipe and the bottom free edge 32 spread axially at the helical opening 46 by separating the lower and upper rib surfaces 37 and 39 until the spread opening 47 is wide enough for entry of the pipe 52 as the latter engages the inner wiping edge 24 of the central wiper opening 26 as in FIG. 7. The wiper 20 is then rotated about its axis until the opening 47 has traveled about the wiper periphery 44 to a position adjacent the top free edge 30 of the wiper 20, as in FIG. 8, at which point, due to the resilience and elasticity of the pipe wiper 20, the latter aligns itself axially with the pipe 52 as in FIGS. 9 and 6. The reinforcing spring 50 resists circumferential expansion of the wiper 20 for retention of pipe contact, but allows for axial spreading for installation on the pipe 52. The rib shoulder 40 and hiatus 42 of the axial spacer means or rib 34 allow for normal manufacturing shrinkage at the outer periphery 44, and provide flexibility and a tendency for the device to revert to its normal shape if distorted in operation. The rib 34 also acts as a spacer or guard to protect the wiper web 22 from damage. Concentric guide rings 23 provide for accurate cutting of the central opening 26 to accommodate different pipe diameters. First rib 36 and second rib 38 keep the adjacent laminar convolutions or turns of web 22 spaced apart to provide a downwardly-sloping helicline web surface and interstital space 48, allowing mud and other foreign material cleaned from the pipe 52 by the inner wiping edge 24 to flow downward off the pipe and back into the well as the pipe is drawn through the wiper. The window openings 28 provide supplemental drainage, serve as sight holes through the wiper and contribute to the flexibility of the wiper web 22. Removal of the wiper 20 is the reverse of installation: the wiper is twisted until its axis is approximately normal to and the top free edge 30 adjacent and in line with the pipe 52, the helical slit or opening 46 spread at that point to its open position 47 to accommodate the pipe, as in FIG. 8, the wiper 20 then rotated or unthreaded to the position of FIG. 7, and removed from the pipe 52 to revert to its normal shape as in FIG. 1. Cleaning subsequent to use is facilitated by flushing water or cleaning liquid from the top edge 30 of the web 22 to its bottom edge 32 through the continuous helicoidal interstitial space 48, checking for cleanliness through the window openings 28.

A modified version or second embodiment of the invention is shown in FIGS. 10–14, inclusive.

Figure 10:
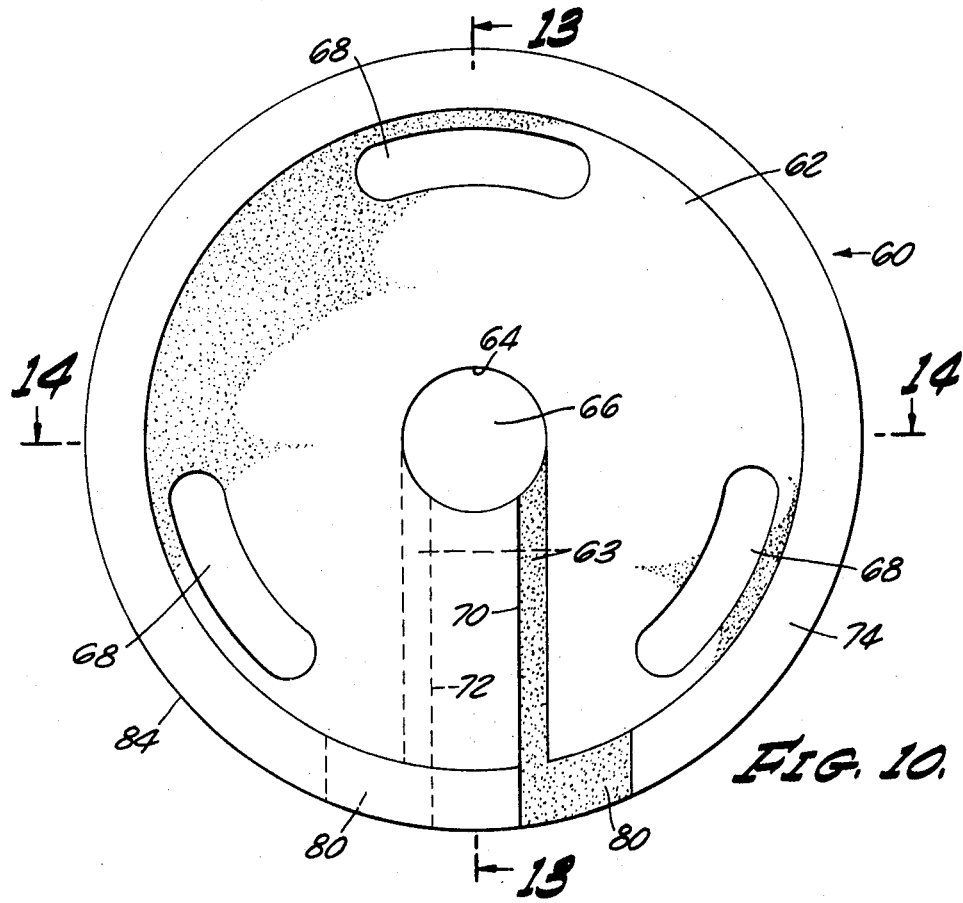
FIG. 10 is a plan view of a modified form of piper in accordance with the invention.

Referring to FIG. 10, there is shown a modified version 60 of the pipe wiper, having two generally parallel flexible web sections 62, connected by an inclined flexible web section 63, forming one continuous web section from the top free edge 70 to the bottom free edge 72, surrounding the central opening 66 to form the inner edge wiping surface 64. Window openings 68 through the web sections 62 serve to increase the flexibility of the wiper 60 in addition to providing added drainage for mud and other foreign material cleaned from the pipe by the inner wiping edge 64. The axial spacer means or rib 74 keeps the laminar convolutions of the web sections 62 and 63 spaced apart from the top edge 70 to the bottom edge 72.

Figure 11:
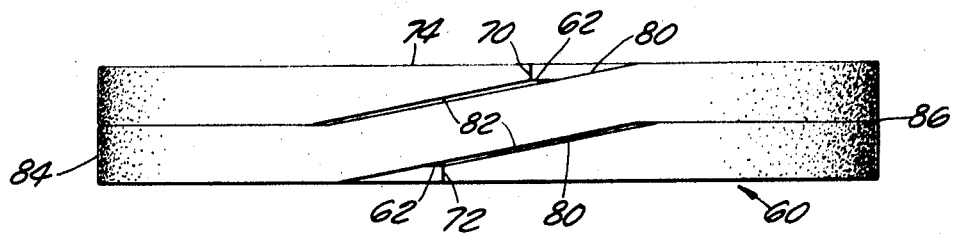
FIG. 11 is a front elevational view of the wiper of FIG. 10.
Figure 12:
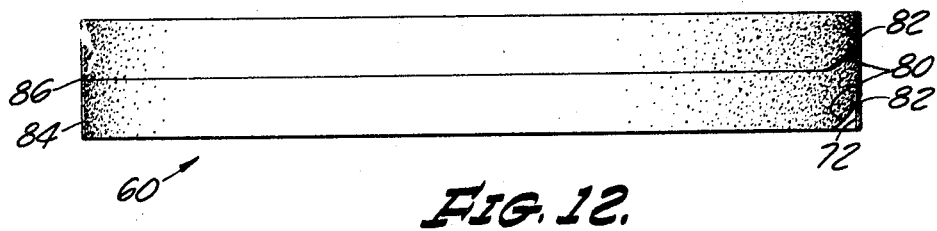
FIG. 12 is a left side elevational view of the wiper of FIG. 10.

Referring now to FIGS. 11 and 12, the axial extension of the peripheral rib 74 stops short of the free ends 70 and 72 at its shoulders 80, providing a hiatus or space 82 therebetween to allow for free contractive movement of the exterior periphery 84 of the wiper 60. Also shown is the peripheral opening 86, extending continuously around the outer periphery 84 of the wiper 60 from its top free end 70 to its bottom free end 72.

Figure 13:
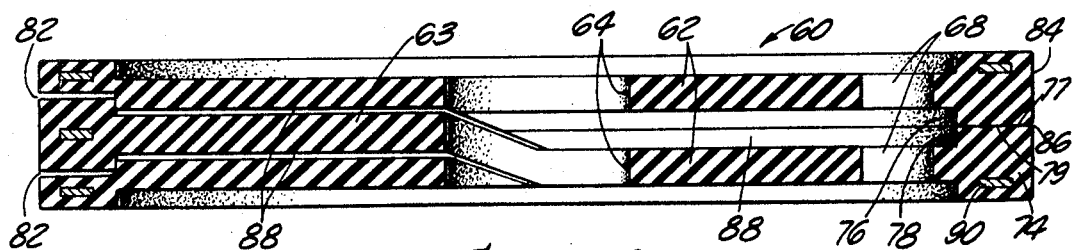
FIG. 13 is an enlarged sectional view taken on the line 13—13 of FIG. 10 and looking in the direction of the arrows.
Figure 14:
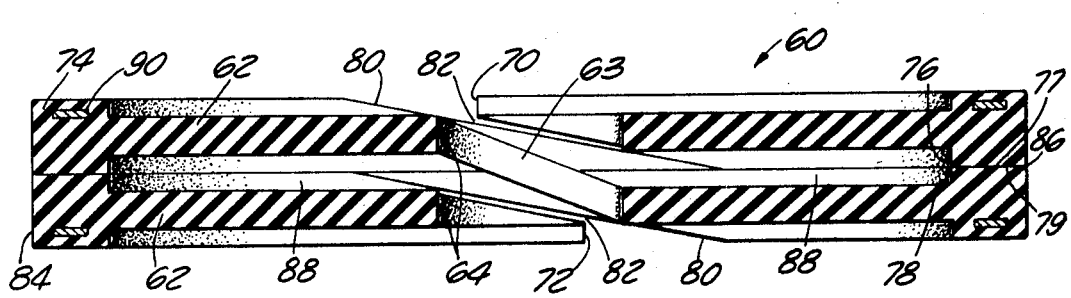
FIG. 14 is a sectional view, on the same scale as FIG. 13, taken on the line 14—14 of FIG. 10, looking in the direction of the arrows.

In FIGS. 13 and 14 is illustrated the axial spacer means 74 near the outer periphery 84 of the wiper 60, with its first or lower rib 76 and second or upper rib 78 separating adjacent laminar turns or convolutions of the web sections 62 and 63 to form a continuous interstitial space 88 from top to bottom of the wiper for effective drainage of wiped mud, the drainage being enhanced also by the window openings 68. The first rib 76 and the second rib 78 have separable lower and upper contact surfaces 77 and 79, respectively, to provide for installation and removal of the wiper 60 onto and off of a pipe. The reinforcing spring member 90 is shown embedded in the peripheral rib 74.

The application of the modified version 60 of the wiper of this invention is similar to that described previously for the preferred embodiment 20. A pipe wiper 60 is held with its axis approximately normal to a pipe and its bottom free edge 72 spread to enlarge the opening 86, allowing the pipe to be inserted in the opening and against the central inner wiping edge surface 64. The wiper 60 is then threaded onto the pipe by rotating it about its axis until the opening 86 is spread at the top free edge 70 of the wiper 60, at which point, due to the resilience and elasticity of the wiper 60, the latter aligns itself axially with the pipe, ready for wiping. The reinforcing spring member 90 resists circumferential expansion of the wiper 60 for retention of pipe contact, but allows for axial spreading for installation on and removal from the pipe. The rib shoulder 80 and hiatus or gap 82 allow for normal shrinkage at the periphery 84 and provide flexibility for the device to revert to its normal shape if distorted in operation. The axial spacer means or rib 74 also acts as a spacer or guard to protect the webs from damage. First rib 76 and second rib 78 keep the adjacent laminar turns of the web spaced apart to provide multiple wiping surfaces 64 at the central opening 66 and an interstitial space 88 for the flow of mud and other material wiped from the pipe as it drains back into the well through the window openings 68 and out at the bottom free edge 72 of the wiper 60. Removal of the wiper 60 from the pipe may be accomplished by a reversal of the installation procedure; and cleaning following usage is effected by flushing water or other cleaning liquid through the continuous interstitial space 88 from the opening at the top edge 70 to the opening at the bottom edge 72.

The wiper of this invention may be produced by the usual rubber compounding and molding procedures familiar to those skilled in the art of elastomer technology, using a formula cured to give an elastomer of good abrasion and flexing characteristics.

While two forms of the device have been shown by way of illustration and description, it should be understood that various modifications will occur to those skilled in the art. For example, referring to FIGS. 10 and 11, the free edges 70 and 72 could be at an angle, rather than parallel, forming a sector between the two radial edges with a small or large central angle. Likewise, the helicoidal transition or inclined web section 63 connecting the top and bottom web sections 62 may be relatively abrupt as shown, or it may be quite gradual, the helicline web section extending more than two revolutions as in the embodiment of the pipe wiper 20 as shown in FIGS. 1, 2, and 3; or it may vary from the two extremes. It should be understood that this invention has application for cleaning other than drill pipe; and where the term "pipe" is used, it may be construed to include tubing, kellys, wire, cable, rope, rods, and other elongated objects which would be wiped by being drawn through the wiper. Where used in this specification, the terms spiral, helical, helicoidal may be considered to be synonymous, and used in the broadest sense to include both true and variant forms.

I claim:
1. A pipe wiper for wiping mud and the like from pipe comprising:
    (a) an annular disc-shaped body having a top surface and a bottom surface substantially parallel thereto;
    (b) said body having a central opening therethrough and an outer peripheral surface;
    (c) said body being a continuous flexible web comprising elastomeric material, one end of said web terminating in said top surface and the other end of said web terminating in said bottom surface;
    (d) said web extending spirally about said central opening for substantially more than 360°;
    (e) the spirals of said web having portions axially overlapping each other, the overlapping portions being axially abuttable with each other and being separable in the axial direction to pass a pipe, between the ends of the latter, from the exterior of the body through the space between the spirals and into the central opening and vice versa; and
    (f) said web having a wiping surface at the central opening adapted to engage the surface of a pipe being drawn through the central opening for wiping mud from the pipe;
wherein the improvement comprises:
    (A) said web (20, 60) having an inner lateral elastomeric web portion (22; 62, 63, 62) extending substantially from said one end (30, 70) to said other end (32, 72) of said web (20, 60);
    (B) said web portion (22; 62, 63, 62) having portions axially overlapping each other, the overlapping portions being axially separated from each other to form a space (48, 88) therebetween, said space (48, 88) extending continuously between said top surface and said bottom surface, communicating laterally with the central opening, and having open ends communicating with the exterior at said surfaces; and
    (C) said web portion (22; 62, 63, 62) having an inner edge (24, 64) providing a wiping surface extending for substantially the entire length of said web portion (22; 62, 63, 62) and adapted to substantially continuously engage the surface of a pipe (52) inserted in said central opening (26, 66), whereby mud that is wiped from the pipe (52) into the space (48, 88) by said inner edge (24, 64) as the pipe (52) is drawn through said central opening (26, 66) flows through the space to one of its open ends for discharge.

2. A pipe wiper as defined in claim 1 wherein said elastomeric web portion (22; 62, 63, 62) and said inner edge (24, 64) extend more than 720° around said central opening (26, 66) so as to provide at least two spaced portions of said inner edge (24, 64) in wiping contact with the pipe (52) at any point on its circumference as it is drawn through the central opening (26, 66).

3. A pipe wiper as defined in claim 1 wherein said axially abuttable portions include mutually contacting spacer means (34, 74), said spacer means being secured to and extending substantially coextensively with the outer periphery of said elastomeric web portion (22; 62, 63, 62) from said one end (30, 70) to said other end (32, 72) of said continuous flexible web (20, 60), said spacer means (34, 74) being axially separable throughout their entire length.

4. A pipe wiper as defined in claim 1 wherein said web (20, 60) includes a spring member (50, 90) embedded therein adjacent to its outer periphery and extending substantially from said one end (30, 70) to said other end (32, 72) said spring member lightly resisting axial separation of said abuttable overlapping portions so as to facilitate the passage of a pipe (52), and strongly resisting circumferential expansion of said web (20, 60) so as to urge said inner edge (24, 64) into wiping contact with the pipe (52) in order to axially align said overlapping portions of said web portion (22; 62, 63, 62) whereby to maintain said space (48, 88) in mud receiving relation to the pipe (52).

5. The pipe wiper as defined in claim 1 wherein said web portion (22) slopes uniformly throughout its entire extent.

6. A pipe wiper as defined in claim 1 wherein said web portion (62, 63, 62) comprises parallel end sections (62, 62) connected together by an inclined intermediate section (63).

References Cited

UNITED STATES PATENTS

| | | | |
|---|---|---|---|
| 2,568,247 | 9/1951 | Medearis | 15—210.2 |
| 2,880,440 | 4/1959 | Shipley | 15—210.2 |
| 2,883,693 | 4/1959 | Leathers et al. | 15—210.2 |
| 3,055,036 | 9/1962 | Minor | 15—210.2 |

ROBERT W. MICHELL, Primary Examiner

LEON G. MACHLIN, Assistant Examiner

U.S. Cl. X.R.

175—84; 277—212, 216